(12) United States Patent
Gambino et al.

(10) Patent No.: US 9,933,577 B2
(45) Date of Patent: Apr. 3, 2018

(54) PHOTONICS CHIP (71) Applicant: GLOBALFOUNDRIES INC., Grand Cayman (KY)

(72) Inventors: Jeffery P. Gambino, Portland, OR (US); Wolfgang Sauter, Eagle-Vail, CO (US); Christopher D. Muzzy, Burlington, VT (US); Charles L. Arvin, Savannah, GA (US); Robert Leidy, Burlington, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 27 days.

(21) Appl. No.: 15/068,059

(22) Filed: Mar. 11, 2016

(65) Prior Publication Data
US 2017/0261693 A1 Sep. 14, 2017

(51) Int. Cl.
| | |
|---|---|
| *G02B 6/12* | (2006.01) |
| *G02B 6/34* | (2006.01) |
| *G02B 6/30* | (2006.01) |
| *G02B 6/124* | (2006.01) |
| *G02B 6/13* | (2006.01) |

(52) U.S. Cl.
CPC ............. *G02B 6/34* (2013.01); *G02B 6/124* (2013.01); *G02B 6/13* (2013.01); *G02B 6/30* (2013.01)

(58) Field of Classification Search
CPC .............. G02B 6/124; G02B 6/13; G02B 6/30
USPC .................................................. 385/14, 31, 37
See application file for complete search history.

(56) References Cited

U.S. PATENT DOCUMENTS

| | | | |
|---|---|---|---|
| 5,420,947 A | * | 5/1995 | Li .................. G02B 6/34 359/569 |
| 5,866,953 A | | 2/1999 | Akram et al. |
| 6,252,308 B1 | | 6/2001 | Akram et al. |
| 6,534,858 B2 | | 3/2003 | Akram et al. |
| 6,595,699 B1 | | 7/2003 | Nguyen et al. |
| 6,617,684 B2 | | 9/2003 | Akram et al. |
| 6,853,069 B2 | | 2/2005 | Akram et al. |
| 6,928,216 B2 | | 8/2005 | Murali et al. |
| 7,160,035 B2 | | 1/2007 | Miyamae et al. |

(Continued)

OTHER PUBLICATIONS

Green et al., "Silicon Photonic Wire Circuits for On-Chip Optical Interconnects", Proc. of SPIE vol. 6883, 2008; 10 pages.

(Continued)

*Primary Examiner* — Ryan Lepisto
*Assistant Examiner* — Guy Anderson
(74) *Attorney, Agent, or Firm* — Michael LeStrange; Andrew M. Calderon; Roberts Mlotkowski Safran Cole & Calderon, P.C.

(57) ABSTRACT

The present disclosure relates to semiconductor structures and, more particularly, to photonics chips and methods of manufacture. A structure includes: a photonics chip having a grated optical coupler; an interposer attached to the photonics chip, the interposer having a grated optical coupler; an optical epoxy material provided between the grated optical coupler of the photonics chip and the grated optical coupler of the interposer; and epoxy underfill material provided at interstitial regions between the photonics chip and the interposer which lie outside of an area of the grated optical couplers of the photonics chip and the interposer.

17 Claims, 4 Drawing Sheets

(56) References Cited

U.S. PATENT DOCUMENTS

| | | | |
|---|---|---|---|
| 7,257,295 B2* | 8/2007 | Yokouchi | G02B 6/24 385/30 |
| 7,388,894 B2* | 6/2008 | O'Daniel | H01S 5/1082 372/32 |
| 7,480,429 B1* | 1/2009 | Chiniwalla | G02B 6/1228 385/129 |
| 7,583,871 B1 | 9/2009 | Bchir et al. | |
| 7,993,941 B2 | 8/2011 | Huang et al. | |
| 8,230,589 B2 | 7/2012 | Lu et al. | |
| 8,267,583 B2* | 9/2012 | Yao | G02B 6/12002 384/31 |
| 8,320,721 B2* | 11/2012 | Cevini | G02B 6/1228 385/131 |
| 8,354,746 B2 | 1/2013 | Huang et al. | |
| 8,355,197 B2* | 1/2013 | Kondo | G02F 1/39 359/330 |
| 8,433,162 B2 | 4/2013 | Pinguet et al. | |
| 8,503,841 B2* | 8/2013 | Kopp | G02B 6/126 385/11 |
| 8,648,470 B2 | 2/2014 | Lin et al. | |
| 8,768,123 B2* | 7/2014 | Yao | G02B 6/12002 385/18 |
| 9,091,827 B2* | 7/2015 | Verslegers | G02B 5/1861 |
| 9,319,148 B2* | 4/2016 | Kerrigan | H04B 10/801 |
| 9,417,410 B2* | 8/2016 | Verslegers | G02B 5/1861 |
| 9,500,806 B2* | 11/2016 | Pitwon | G02B 6/0065 |
| 2001/0015492 A1 | 8/2001 | Akram et al. | |
| 2001/0046363 A1 | 11/2001 | Purchase et al. | |
| 2002/0195699 A1 | 12/2002 | Akram et al. | |
| 2003/0113947 A1* | 6/2003 | Vandentop | H01L 24/81 438/27 |
| 2004/0036160 A1 | 2/2004 | Akram et al. | |
| 2005/0189646 A1 | 9/2005 | Akram et al. | |
| 2006/0133729 A1* | 6/2006 | Cho | G02B 6/4201 385/37 |
| 2006/0138680 A1 | 6/2006 | Weber | |
| 2006/0258120 A1* | 11/2006 | Gilroy | H01L 24/81 438/455 |
| 2006/0267171 A1 | 11/2006 | Lee | |
| 2007/0069372 A1 | 3/2007 | Akram et al. | |
| 2007/0221939 A1 | 9/2007 | Taskar et al. | |
| 2009/0003762 A1* | 1/2009 | Chiniwalla | G02B 6/1228 385/14 |
| 2010/0140771 A1 | 6/2010 | Huang et al. | |
| 2011/0127633 A1* | 6/2011 | Nadeau | H01L 23/544 257/506 |
| 2011/0254157 A1 | 10/2011 | Huang et al. | |
| 2012/0187568 A1 | 7/2012 | Lin et al. | |
| 2013/0075899 A1 | 3/2013 | Huang | |
| 2013/0114924 A1 | 5/2013 | Loh et al. | |
| 2013/0183010 A1* | 7/2013 | Fangman | G02B 6/36 385/93 |
| 2014/0010498 A1* | 1/2014 | Verslegers | G02B 5/1861 385/37 |
| 2014/0029894 A1* | 1/2014 | Bowen | G02B 6/30 385/37 |
| 2014/0077381 A1 | 3/2014 | Lin et al. | |
| 2014/0112363 A1* | 4/2014 | Feitisch | B23K 20/24 372/43.01 |
| 2015/0014684 A1 | 1/2015 | Miyanaga et al. | |
| 2015/0037044 A1* | 2/2015 | Peterson | G02B 6/4292 398/135 |
| 2015/0211960 A1* | 7/2015 | Shimizu | G02B 6/02057 356/73.1 |
| 2015/0285998 A1* | 10/2015 | Babakhani | G02B 6/13 438/27 |
| 2015/0286008 A1* | 10/2015 | Shimizu | G02B 6/34 385/37 |
| 2015/0331197 A1* | 11/2015 | Verslegers | G02B 5/1861 385/14 |
| 2015/0370015 A1* | 12/2015 | Aoki | G02B 6/4204 385/14 |
| 2016/0062063 A1* | 3/2016 | Ogura | G02B 6/428 385/14 |
| 2016/0238793 A1* | 8/2016 | Frankel | G02B 6/305 |
| 2016/0291265 A1* | 10/2016 | Kinghorn | G02B 6/131 |
| 2016/0294155 A1* | 10/2016 | Zheng | H01S 5/0228 |
| 2016/0334590 A1* | 11/2016 | Celo | G02B 6/4225 |
| 2016/0341895 A1* | 11/2016 | Bienstman | G02B 6/34 |
| 2016/0359568 A1* | 12/2016 | De Dobbelaere | H04B 10/801 |
| 2017/0047312 A1* | 2/2017 | Budd | H01L 25/167 |

OTHER PUBLICATIONS

Lindenmann et al., "Photonic Wire Bonding: a Novel Concept for Chipscale Interconnects", Optics Express, vol. 20, No. 16, Jul. 30, 2012; 11 pages.

Connor, Samantha R., "Engineering Properties of High Refractive Index Optical Gels for Photonic Device Applications", SPIE, vol. 3937, 2000; 12 pages.

Intertronics, "Polytec PT", http://www.intertronics.co.uk/products/optical_adhesives_01.htm, May 2015; 7 pages.

Namics Corporation, "Chipcoat", http://www.namics.co.jp/e/product/chipcoat01.html, 2013; 1 page.

* cited by examiner

PHOTONICS CHIP

FIELD OF THE INVENTION

The present disclosure relates to semiconductor structures and, more particularly, to photonics chips and methods of manufacture.

BACKGROUND

Silicon photonics chips are being developed for high speed interconnects between dies. Waveguides can be built on SOI wafers and can be integrated with CMOS devices. In these structures, though, a connection must be made between an "off-chip" optical fiber and the waveguide. Out-of-plane coupling uses an optical grating to couple light from the fiber to the waveguide, but this limits the optical signal to one wavelength. In-plane coupling, on the other hand, allows broadband transmission (e.g., multiple wavelengths) and hence higher bandwidth.

SUMMARY

In an aspect of the disclosure, a structure comprises: a photonics chip having a grated optical coupler; an interposer attached to the photonics chip, the interposer having a grated optical coupler; an optical epoxy material provided between the grated optical coupler of the photonics chip and the grated optical coupler of the interposer; and epoxy underfill material provided at interstitial regions between the photonics chip and the interposer which lie outside of an area of the grated optical couplers of the photonics chip and the interposer.

In an aspect of the disclosure, a structure comprises: a photonics chip mounted to an interposer with a plurality of solder connections; at least one cavity formed between the photonics chip and the interposer; grated optical couplers provided on opposing sides of the at least one cavity; at least one waveguide structure providing an optical transmission to the grated optical couplers; an optical fiber coupled to the waveguide structure; an optical epoxy material provided within the at least one cavity between the grated optical couplers; and epoxy underfill material provided at interstitial regions between the plurality of solder connections.

In an aspect of the disclosure, a method comprises: connecting a photonics chip to an interposer with a plurality of solder connections; filling a space between grated optical couples of the photonics chip and the interposer with optical epoxy material; and filling interstitial spaces between the photonics chip and the interposer with underfill material which is different than the optical epoxy material.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to semiconductor structures and, more particularly, to photonics chips and methods of manufacture. In more specific embodiments, the photonics chips comprise dual underfill material. The dual underfill material includes, e.g., an optical epoxy and conventional underfill material. In embodiments, the optical epoxy is provided in localized regions of the die and interposer where optical transmission is required, with the conventional underfill material provided in remaining regions (i.e., where optical transmission is not required). In more specific embodiments, the optical epoxy is provided at the interface of grated optical couplers of the photonics chip and interposer, whereas, the conventional underfill material is filled in interstitial regions outside of the grated optical couplers, providing mechanical and structural integrity to the joined interposer and die (e.g., photonics chip). Advantageously, the optical epoxy provides an improved optical pathway between an optical fiber and the grated optical couplers of the photonics chip.

The conventional underfill is typically applied between the photonics chip and the interposer to provide mechanical support for solder bump connections. Although conventional underfill materials have preferred coefficient of thermal efficient matching with other structures of the photonics chip, they are known to exhibit poor optical qualities. That is, conventional underfill materials degrade optical transmission because the index of refraction is not optimized. Optical epoxies, on the other hand, provide high optical transmission, but these materials have high coefficient of thermal expansion (CTE), and therefore will result in high stress and possible mechanical failure during assembly. Hence, the photonics chip described herein optimizes both optical transmission and low CTE underfill materials to provide an improved photonics chip with high yields.

The photonics chips of the present disclosure can be manufactured in a number of ways using a number of different tools. In general, though, the methodologies and tools are used to form structures with dimensions in the micrometer and nanometer scale. The methodologies, i.e., technologies, employed to manufacture the photonics chip of the present disclosure have been adopted from integrated circuit (IC) technology. For example, the structures are built on wafers and are realized in films of material patterned by photolithographic processes on the top of a wafer. In particular, the fabrication of the photonics chips uses three basic building blocks: (i) deposition of thin films of material on a substrate, (ii) applying a patterned mask on top of the films by photolithographic imaging, and (iii) etching the films selectively to the mask.

Figure 1:
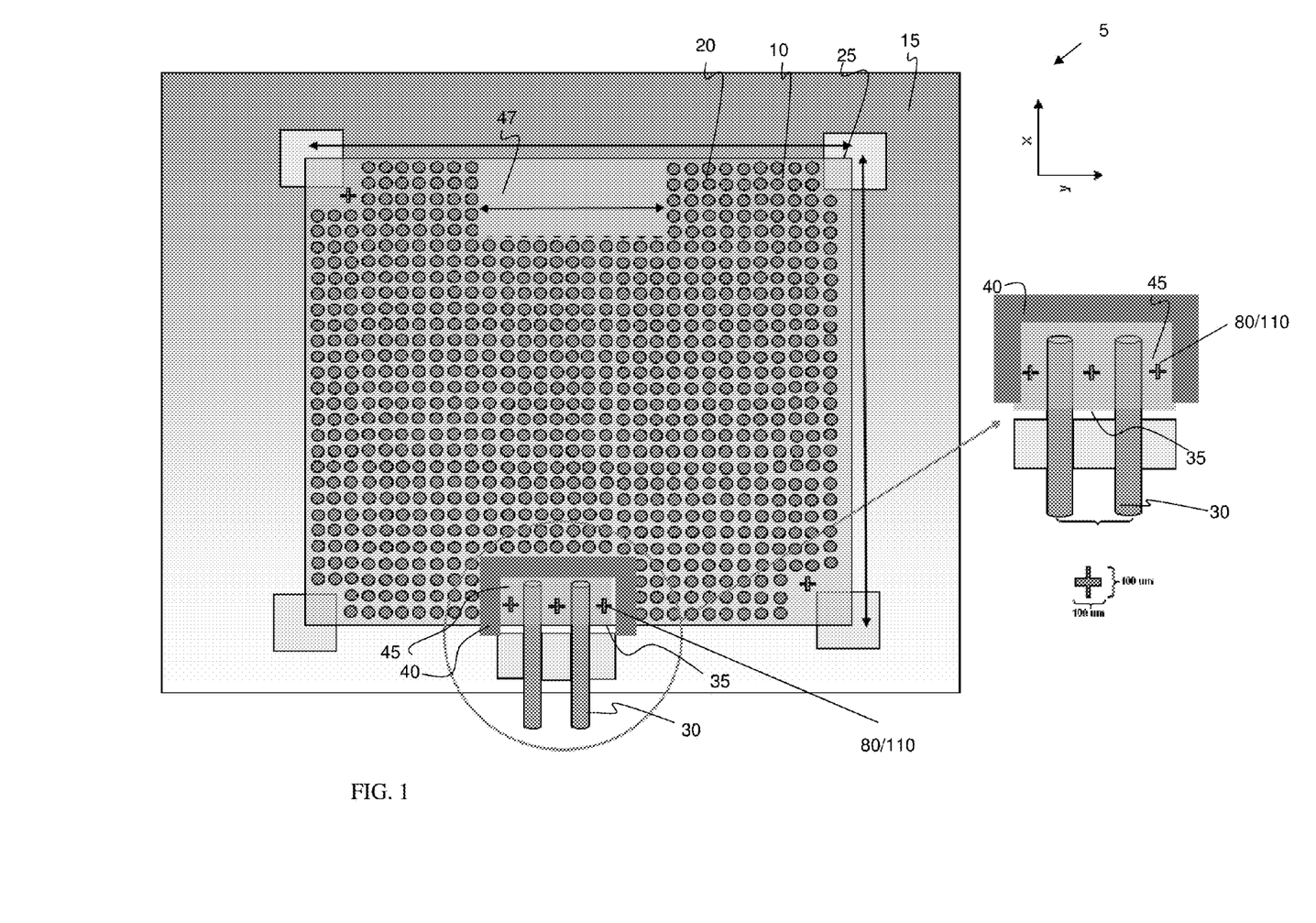
FIG. 1 shows a top view of a photonics chip positioned on an interposer with optical fibers in accordance with aspects of the present disclosure.

FIG. 1 shows a top view of a photonics chip positioned on an interposer with optical fibers in accordance with aspects of the present disclosure. More specifically, the structure 5 includes a substrate 10 (e.g., photonics chip) mounted on an interposer 15. In embodiments, the photonics chip 10 includes a waveguide structure (see, e.g., FIGS. 3 and 4) and a plurality of connections 20. In embodiments, the plurality of connections 20 are composed of a ball grid array and, more specifically, a plurality of solder balls. In embodiments, the solder balls can be, e.g., controlled collapse chip connections (C4 connections).

As one of skill in the art would understand, C4 connections is a process for interconnecting semiconductor devices, such as integrated circuit chips to external circuitry with solder bumps that have been deposited onto chip pads. The solder bumps are deposited on the chip pads on the top side of the wafer during the final wafer processing step. In order to mount the chip to external circuitry (e.g., a circuit board or another chip or wafer), it is flipped over so that its top side faces down, and aligned so that its pads align with matching pads on the external circuit, and then the solder is reflowed to complete the interconnect. This is in contrast to wire bonding, in which the chip is mounted upright and wires are used to interconnect the chip pads to external circuitry.

Still referring to FIG. 1, the photonics chip 10 can be mounted onto polymer spacers 25, which are positioned between the photonics chip 10 and the interposer 15. The interposer 15 can be, for example, a glass interposer or SOI substrate as examples. One or more optical fibers 30 are optically coupled to the photonics chip 10 and more specifically to the waveguide structure. In more specific embodiments, the optical fibers 30 are coupled to a Si waveguide structure. An optical cavity/transmission critical area represented by reference numeral 35 is formed between the interposer 15 and photonics chip 10.

In embodiments, the optical cavity/transmission critical area includes an optical grating above and below the cavity 35 in order to transmit light between waveguide structures. The optical gratings are represented by reference numerals 80, 110 and are more clearly shown in FIG. 4, for example. In embodiments, the cavity 35 is surrounded or enclosed using, at least in part, a barrier structure 40. As should be understood, the interposer 15 can include a vertical coupling using optical grating within a critical transmission area, as shown more clearly in FIG. 4.

As described herein, the barrier structure 40 is composed of a low or no-flow underfill material, e.g., polymer material, in any of the aspects described herein. In embodiments, the underfill material 40 is a high viscous polymer material that has minimal or does not flow during attachment of the interposer 15 to the photonics chip 10. Accordingly, the underfill material 40 can be applied to the surface of either the interposer 15 or the photonics chip 10 prior to the joining process. Once the underfill material 40 is applied, the interposer 15 can be joined to the photonics chip 10 by a press fitting process. In embodiments, the underfill material 40 will have a CTE that substantially matches to the CTE of both the interposer 15 and/or the photonics chip 10.

After the joining process, the underfill material 40 can be cured at a low temperature, e.g., 150° C. for about 1 hour to 2 hours. A UV curing is also contemplated herein. For example, optical epoxy based UVs have a cationic curing reaction. This kind of system can exhibit a lower shrinkage (1-2%) and higher temperature resistance. In embodiments, this cure process will attach the interposer 15 to the photonics chip 10 and will also result in the formation of the cavity 35 surrounding the optical transmission area, e.g., optical grating of the photonics chip 10 and interposer 15. Following the cure or after other processes, the solder 20 can be reflowed to complete the attachment of the interposer 15 to the photonics chip 10.

In embodiments, the optical fibers 30 can be coupled to the waveguide structure, followed by the cavity 35 being filled with a low viscosity optical epoxy material 45 by capillary flow techniques, e.g., injection or jet dispensing of the optical epoxy material 45 into the cavity 35. In contemplated embodiments, the optical epoxy material 45 can include materials manufactured by, e.g., Polytec PT.

More specifically, the low viscosity optical epoxy material 45 can be dispensed next to the cavity 35, spreading with capillary force caused by a narrow gap between the photonics chip 10 and the interposer 15. Advantageously, in embodiments, the underfill material 40 will provide a boundary for maintaining the optical epoxy material 45 within the confined area of the optical transmission region (e.g., optical grating couplers) during this capillary flow process. The remaining spaces, e.g., interstitial areas between the solder balls 20, can then be filled with conventional underfill material 47, through similar injection or jet dispensing methods, to provide mechanical stability to the die (photonics chip) 10 mounted on the interposer 15.

The underfill material 47 should preferably have a coefficient of thermal expansion (CTE) approximately equal to the solder upon curing and/or the photonics chip 10 and the interposer 15, and serves to distribute the stresses that would otherwise be concentrated on localized regions of the solder connections 20. The underfill material 47 and the optical epoxy material 45 can be cured using conventional processes known to those of skill in the art.

By way of more specific example and still referring to FIG. 1, the cavity 35 surrounds the optical transmission area, e.g., localized to the optical gratings, and can include dimensions based on the structural dimensions (e.g., width, height and length) of the optical gratings, as well as other design and engineering criteria. For example, the cavity 35 can be dimensioned to accommodate any type of waveguide structure or optical gratings used in photonics chip packaging. Specifically, the underfill material 40 can be about 200 microns to about 300 microns wide, surrounding the optical transmission area, e.g., forming cavity 35. The height of the underfill material 40 can be about 85 microns to about 90 microns, in one illustrative non-limiting example. Moreover, although it is preferred that the underfill material 40 surrounds the entirety of the cavity 35, in aspects provided herein the underfill material 40 need only be dimensioned and structured to prevent the low viscosity optical epoxy material 45 from diffusing out of the cavity 35, potentially degrading the structural integrity of the photonics chip due to CTE mismatch with the photonics chip 10 and/or the interposer 15.

In further embodiments, the height of the underfill material 40 can extend completely between the facing surfaces of the photonics chip 10 and the interposer 15. In alternative aspects, the height of the underfill material 40 can extend partially between the facing surfaces of the photonics chip 10 and the interposer 15, leaving a space between the underfill material 40 and the interposer 15. In this embodiment, the reflow of the solder 45 will provide the initial connection between the interposer 15 and the photonics chip 10, while the space can be dimensioned to prevent the low viscosity optical epoxy material 45 from diffusing out of the cavity 35, as based on the viscosity of the optical epoxy material 45. For example, the dimensions of the space will have such a height as to prevent the optical epoxy material 45 from expanding beyond the cavity 35 and/or degrading structural integrating of the waveguide structure.

Figure 2:
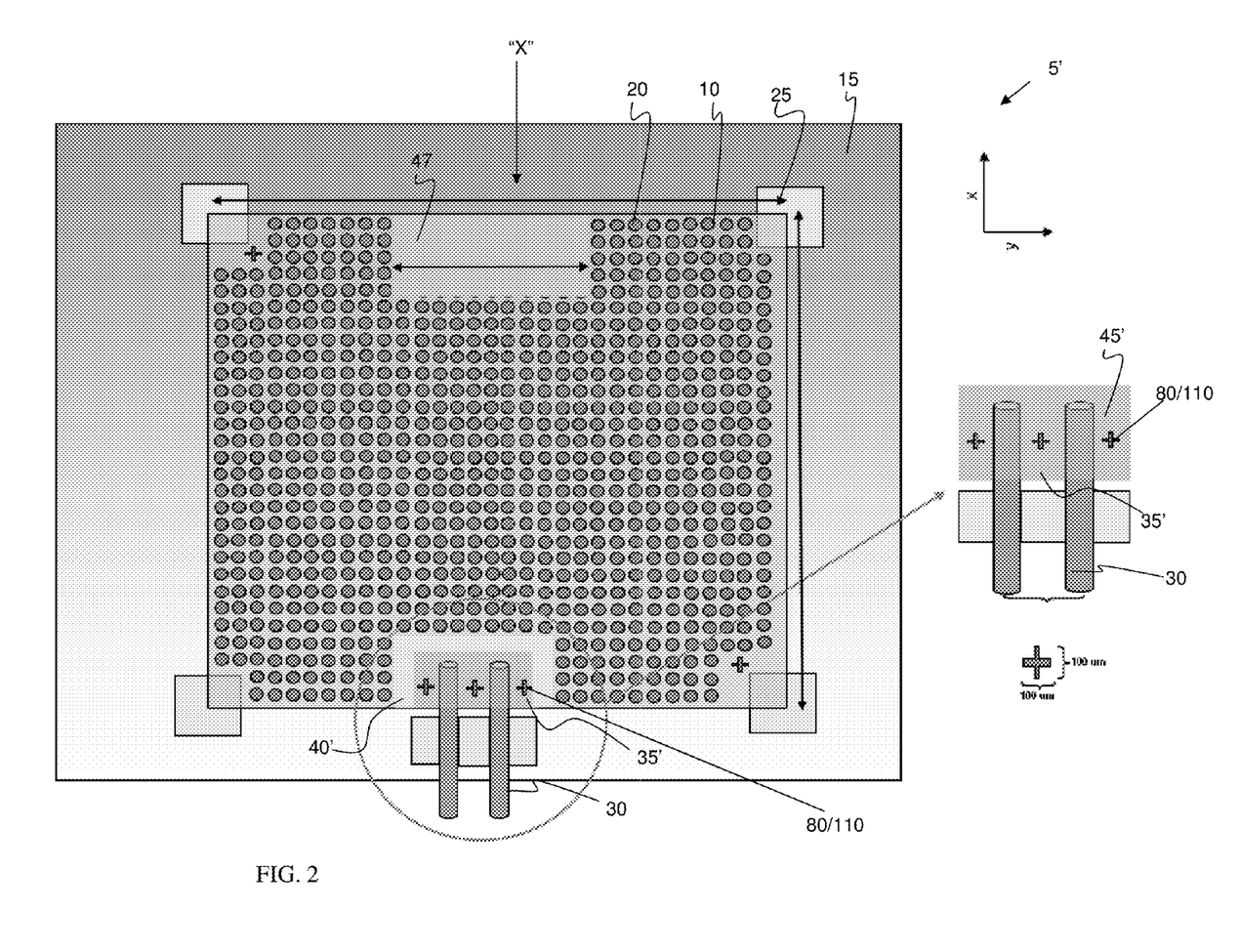
FIG. 2 shows a top view of a photonics chip positioned on an interposer with optical fibers in accordance with additional aspects of the present disclosure.

FIG. 2 shows a top view of a photonics chip positioned on an interposer with optical fibers in accordance with additional aspects of the present disclosure. Specifically, in the structure 5' of FIG. 2, the optical epoxy material 45' can be applied in the localized area 35', prior to the joining of the interposer 15 to the photonics chip 10. In this aspect, the optical epoxy material 45' will exhibit low or no-flow characteristics, e.g., exhibit high viscosity characteristics such that the optical epoxy material 45' will remain in the local area 35', e.g., area of the optical transmission, during the joining process. Also, in this aspect, due to the flow characteristics of the optical epoxy material 45', the use of the underfill material 40 shown in FIG. 1 can be eliminated. In contemplated embodiments, the optical epoxy material 45' can include materials manufactured by, e.g., Polytec PT.

In embodiments shown in FIG. 2, the optical epoxy material 45' is applied to the surface of either the interposer 15 or the photonics chip 10, which can then be joined together by a press fitting process. Once joined together or after other processes, the solder 20 can be reflowed to complete the attachment of the interposer 15 to the photonics chip 10. The remaining spaces, e.g., interstitial areas between the solder balls 20, can then be filled with conventional underfill material 47, as described herein, to provide mechanical stability to the photonics chip 10 mounted on the interposer 15. The underfill material 47 and the optical epoxy material 45' can be cured using conventional processes known to those of skill in the art.

In alternative embodiments, the underfill material 47 can be applied prior to the joining of the interposer 15 to the photonics chip 10, by applying the underfill material 47 to surface of either the interposer 15 or the photonics chip 10. Once the underfill material 47 and the optical epoxy material 45' are applied to the surface of either the interposer 15 or the photonics chip 10, the interposer 15 can be attached to the photonics chip 10 by a press fitting operation followed by a reflow process of the solder connections 20.

In alterative embodiments as also represented by FIG. 2, the optical epoxy material 45' can be a low viscosity epoxy material applied by a capillary flow process, e.g., injection or jet dispensing processes, after the interposer 15 is attached to the photonics chip 10 by a reflow processes of the solder 45. In this aspect, the optical epoxy material 45' will be injected into the local area 35', e.g., area of the optical transmission; whereas, the remaining spaces, e.g., interstitial areas between the solder balls 20, can then be filled with conventional underfill material 47. As to the latter point, following the injection of the optical epoxy material 45', the interstitial areas between the solder balls 20 can be filled with conventional underfill material 47 to provide mechanical stability to the photonics chip 10 mounted on the interposer 15. In this aspect, the optical epoxy material 45' will be injected at the local area 35; whereas, the conventional underfill material 47 can be injected from an opposing side of the structure 5' (as designated by the arrow labeled "X"). Also, the conventional underfill material 47 will be applied by a measured timing in order to ensure that the conventional underfill material 47 does not creep into the localized optical area 35'. The underfill material 47 and the optical epoxy material 45' can be cured using conventional processes known to those of skill in the art as described already herein.

Figure 3:
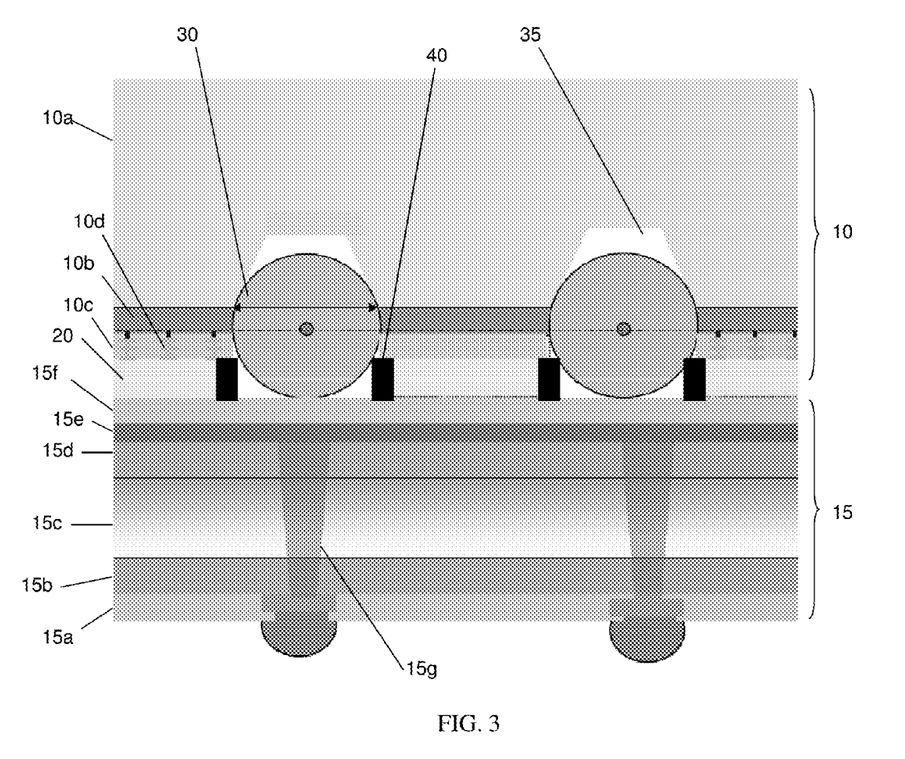
FIG. 3 shows a cross-sectional view of the photonics chip positioned on an interposer with optical fibers in accordance with aspects of the present disclosure.

FIG. 3 shows a cross-sectional view of the photonics chip package in accordance with aspects of the present disclosure. As shown in FIG. 3, the photonics chip 10 is mounted on the interposer 15, with the optical fibers 30 providing optical transmission into separate cavities 35 (e.g., optical cavity) formed between the photonics chip 10 and interposer 15. In embodiments, the cavity 35 is surrounded by the underfill material 40. For illustrative purposes, the cavity 35 is not filled with the optical epoxy material.

In embodiments, the photonics chip 10 can include several layers including a semiconductor substrate 10a, an insulator layer 10b (buried oxide layer (BOX)) and back end of the line (BEOL) metal fill layers 10c with guardring structures 10d formed therein. The photonics chip 10 further includes the plurality of solder connections represented at reference numeral 20. The interposer 15 can include several layers including, e.g., a passivation layer 15a, a polymer layer 15b, a glass interposer layer 15c, a polymer layer 15d, a copper layer 15e and a passivation layer 15f. The interposer 15 can further include a conductive (metal) via connection 15g as should be understood by those of skill in the art. It should be understood by those of skill in the art that the photonics chip 10 and interposer 15 can include other layers depending on the design and engineering considerations for the particular application as described herein.

Figure 4:
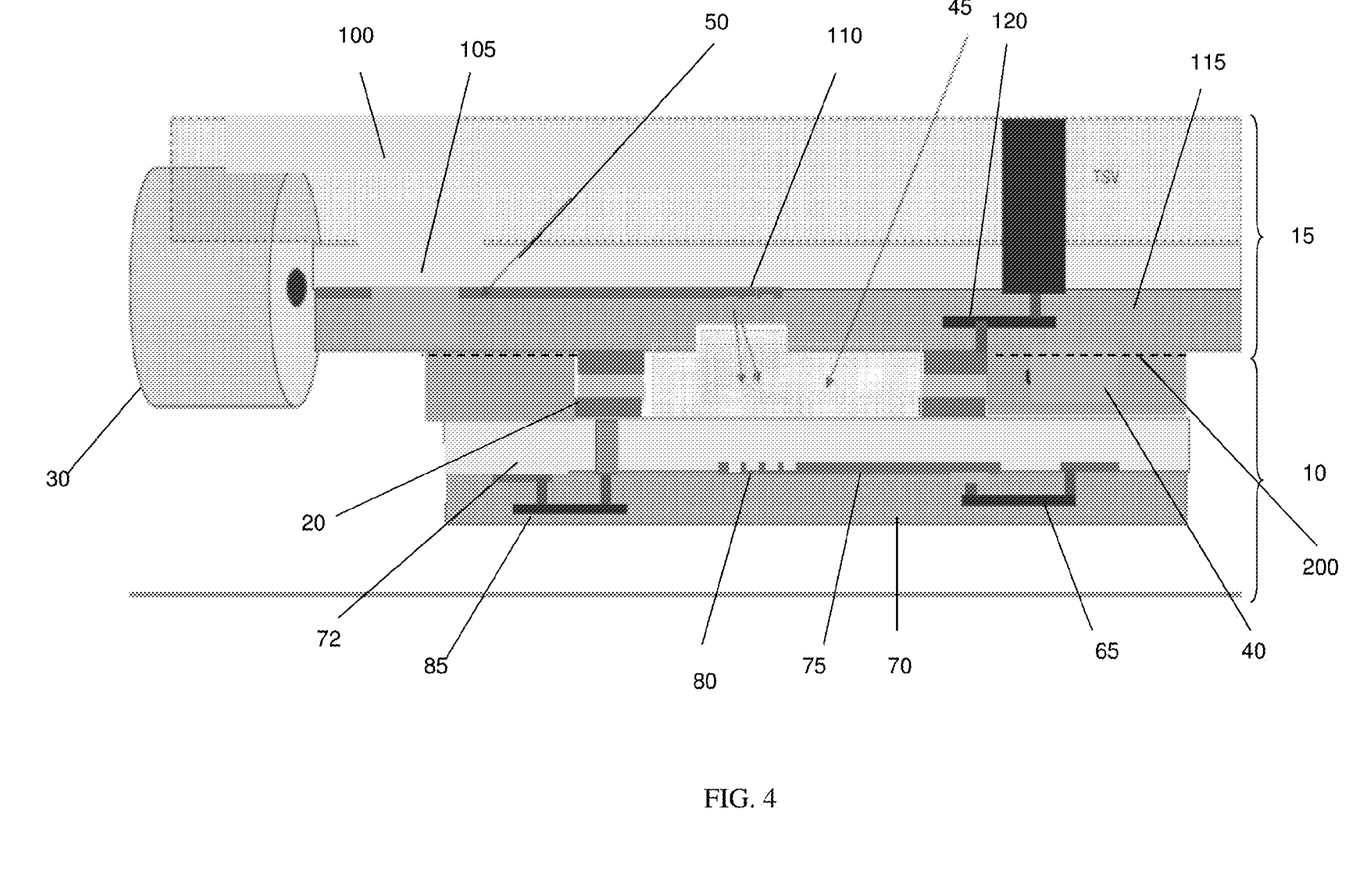
FIG. 4 shows cross-sectional view of the photonics chip positioned on an interposer with optical fibers in accordance with additional aspects of the present disclosure.

FIG. 4 shows a cross-sectional view of an alternative photonics chip and interposer with optical fibers in accordance with aspects of the present disclosure. In this embodiment, the interposer 15 includes a vertical coupling using optical grating within a transmission area, e.g., cavity 35, surrounded by the underfill material 40. As shown in FIG. 4, the photonics chip 10 is mounted on the interposer 15, with the optical fibers 30 coupled to a Si waveguide structure 50.

In more specific embodiments, the photonics structure (e.g., photonics chip) 10 is a silicon photonics chip. The silicon photonics chip 10 includes a substrate assembly (e.g., silicon-on-insulator (SOI) (handle wafer)) comprising a plurality of CMOS devices 65 formed on the substrate 70, and a silicon waveguide 75 disposed/formed on the substrate 70. A grated optical coupler 80 optically couples the silicon waveguide 75 to an optical signal (e.g., optical fiber).

More specifically, as should be understood by those of skill in the art, the grated optical coupler 80 is used to redirect light in a waveguide into an optical detector external to the waveguide. In embodiments, the grated optical coupler 80 can redirect light into the grated optical coupler 110 of the interposer, or vice versa. Light that has been traveling transversely through the waveguide by reflecting off the waveguide's inner surface at shallow angles may be redirected so that it strikes the inner surface of the waveguide at a sharper angle that is greater than the critical angle of incidence, thus allowing the light to escape through the surface. After escaping, the light may impinge upon a detector (e.g., CMOS devices 65). The detected light may then be used for various purposes, such as to receive an encoded communications signal that was transmitted through the waveguide.

A buried oxide layer (BOX) 72 is formed on the substrate 70 and electrically insulates the silicon waveguide 75. A plurality of patterned electrical interconnects 85 are provided to make electrical connections to BEOL structures (CMOS devices) 65, and a dielectric layer 90 underlying the BOX layer 65 insulates the plurality of electrical interconnects 85 and CMOS devices 65. A plurality of solder structures (C4 balls) 20 are formed in electrical contact with the CMOS devices 65 and other structures, e.g., waveguide structures.

Still referring to FIG. 4, a second substrate assembly, e.g., interposer 15, is coupled to the plurality of solder structures 20, which includes a silicon interposer 100, a BOX layer 105 underlying silicon interposer 100, a silicon waveguide structure 50 formed on the BOX layer 105 and a plurality of BEOL structures generally represented at reference numeral 115. A grated optical coupler 110 overlies the waveguide structure 50 to couple the optical signal, e.g., couples the optical transmission with the grated optical coupler 80. The interposer 15 further includes a plurality of electrical contacts 120 connecting photonics chip 10 and the interposer 15. An optical epoxy 45 is deposited in the cavity 35 formed between the substrates, e.g., photonics chip 10 and interposer 15, directly overlying the grated optical coupler 80 and directly underlying the grated optical coupler 110.

As further shown in this view, the underfill material 40 extends fully between facing surfaces of the photonics chip 10 and the interposer 15, and surrounding the cavity 35. That is, the underfill material 40 contacts the facing surface of both the photonics chip 10 and the interposer 15. In alternative embodiments, the underfill material 40 can also include a space as represented by dashed line 200.

As should now be understood by those of skill in the art, in embodiments, the optical epoxy material 45 (or 45') is provided in a localized area to span a gap (cavity 35) between the grated optical couplers 80, 110. The conventional underfill material can then fill remaining regions, outside of the optical region. In embodiments, the optical epoxy material 45 (or 45') can be applied in different processes during different steps of fabrication according to aspects described herein. For example, the optical epoxy material 45 (or 45') is first applied in the localized regions, followed by attachment of the die (photonics chip) 10 and interposer 15 followed by conventional capillary flow underfill material being applied. In alternative embodiments, the optical epoxy material 45 (or 45') is applied in localized regions with the conventional underfill material being applied to other regions, followed by attachment of the photonics chip 10 and interposer 15. In yet additional embodiments, the photonics chip 10 and interposer 15 can be attached by solder reflow processes, followed by capillary flow of the optical epoxy material 45 in the localized regions, e.g., regions of the optical transmission, with capillary flow of the conventional underfill material in remaining regions.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure comprising:
a photonics chip having a grated optical coupler;
an interposer attached to the photonics chip, the interposer having a grated optical coupler;
an optical epoxy material provided within a cavity formed between the grated optical coupler of the photonics chip and the grated optical coupler of the interposer;
epoxy underfill material provided at interstitial regions between the photonics chip and the interposer which lie outside of an area of the grated optical couplers of the photonics chip and the interposer; and
a barrier material which is structured to form the cavity and to maintain the optical epoxy material within the cavity.

2. The structure of claim 1, wherein the barrier material is a cured underfill material.

3. The structure of claim 2, wherein the optical epoxy material is a low viscosity optical epoxy material, compared to the cured underfill material.

4. The structure of claim 1, wherein the epoxy underfill material is a polymer material with a coefficient of thermal expansion (CTE) that substantially matches the CTE of the photonics chip and the interposer.

5. The structure of claim 1, wherein the optical epoxy material is localized within an optical transmission region of the grated optical couplers of the photonics chip and the interposer.

6. The structure of claim 1, wherein the optical epoxy material and the epoxy underfill material are flowable materials.

7. A structure, comprising:
a photonics chip mounted to an interposer with a plurality of solder connections;
at least one cavity formed between the photonics chip and the interposer;
grated optical couplers provided on opposing sides of the at least one cavity;
at least one waveguide structure providing an optical transmission to the grated optical couplers;
an optical fiber coupled to the waveguide structure;
an optical epoxy material provided within the at least one cavity between the grated optical couplers; and
epoxy underfill material provided at interstitial regions between the plurality of solder connections.

8. The structure of claim 7, wherein the at least one cavity is at least partly surrounded by a barrier material.

9. The structure of claim 8, wherein the barrier material is a no or low flow underfill material.

10. The structure of claim 9, wherein the no or low flow underfill material is a polymer material.

11. The structure of claim 10, wherein the polymer material is a cured material which prevents the optical epoxy material from exiting from the at least one cavity.

12. The structure of claim 11, wherein the optical epoxy material is a low viscosity optical epoxy material, compared to the cured underfill material.

13. The structure of claim 7, wherein the optical epoxy material is localized within an optical transmission region of the grated optical couplers of the photonics chip and the interposer.

14. The structure of claim 7, wherein the optical epoxy material and the epoxy underfill material are flowable materials.

15. The structure of claim 1, wherein the grated optical coupler of the photonics chip and the grated optical coupler of the interposer are provided on opposing sides of the cavity.

16. The structure of claim 15, further comprising at least one waveguide structure providing an optical transmission to the grated optical couplers and an optical fiber coupled to the waveguide structure.

17. The structure of claim 1, wherein:
the barrier material is composed of a low or no-flow underfill polymer material that does not flow during attachment of the interposer to the photonics chip,
the barrier material is UV cured and has a CTE that substantially matches to the CTE of both the interposer and the photonics chip,
the barrier material is different than the optical epoxy, and
the epoxy material is a flowable material.

\* \* \* \* \*

UNITED STATES PATENT AND TRADEMARK OFFICE
CERTIFICATE OF CORRECTION

PATENT NO. : 9,933,577 B2
APPLICATION NO. : 15/068059
DATED : April 3, 2018
INVENTOR(S) : Gambino et al.

Page 1 of 1

It is certified that error appears in the above-identified patent and that said Letters Patent is hereby corrected as shown below:

On the Title Page

Item (72), change spelling of inventor: "JEFFERY P. GAMBINO", to -- JEFFREY P. GAMBINO --.

Signed and Sealed this
Third Day of July, 2018

Andrei Iancu
*Director of the United States Patent and Trademark Office*